(12) United States Patent
Santoro (10) Patent No.: US 9,733,411 B2
(45) Date of Patent: Aug. 15, 2017

(54) LIGHT EXTRACTION ELEMENTS (71) Applicant: Fluxwerx Illumination Inc., Delta (CA)

(72) Inventor: Scott Santoro, Delta (CA)

(73) Assignee: FLUXWERX ILLUMINATION INC., Surrey (CA)

( * ) Notice: Subject to any disclaimer, the term of this patent is extended or adjusted under 35 U.S.C. 154(b) by 0 days.

(21) Appl. No.: 14/438,987

(22) PCT Filed: Oct. 31, 2013

(86) PCT No.: PCT/CA2013/050827
§ 371 (c)(1),
(2) Date: Apr. 28, 2015

(87) PCT Pub. No.: WO2014/067006
PCT Pub. Date: May 8, 2014

(65) Prior Publication Data
US 2015/0285983 A1 Oct. 8, 2015

Related U.S. Application Data (60) Provisional application No. 61/720,961, filed on Oct. 31, 2012.

(51) Int. Cl.
*F21V 7/04* (2006.01)
*F21V 8/00* (2006.01)
*F21V 7/00* (2006.01)

(52) U.S. Cl.
CPC .......... *G02B 6/0045* (2013.01); *G02B 6/0038* (2013.01); *G02B 6/0063* (2013.01); *F21V 7/0091* (2013.01)

(58) Field of Classification Search
CPC ....... G02B 6/0038; G02B 6/0045; F21V 5/04; F21V 7/0091
See application file for complete search history.

(56) References Cited

U.S. PATENT DOCUMENTS 5,128,787 A 7/1992 Blonder
5,608,837 A 3/1997 Tai et al.
(Continued)

FOREIGN PATENT DOCUMENTS

CN 1952701 A 4/2007
CN 101151582 A 3/2008
(Continued)

OTHER PUBLICATIONS

Foley, Michael F., "Microstructured optical components fr waveguide-based luminaires", Corporate Technical White Paper, 2001, 9 pages. <http://www.orafol.com/tl_files/EnergyUSA/papers?Microstructured-Optical-Comoments-for-Waveguide-based-Luminaires_Foley.2001.pdf>, retrieved Jan. 23, 2014.

*Primary Examiner* — Alexander Garlen
(74) *Attorney, Agent, or Firm* — Oyen Wiggs Green & Mutala LLP (57) ABSTRACT

A light guide is provided. The light guide includes a first major surface comprising an array of Z-shaped extraction elements. Each Z-shaped extraction element includes: a first face; a second face adjoining the first face, wherein the first face and an upper portion of the second face define an indentation projecting inwardly from a plane defined by the first major surface; and a third face adjoining the second face, wherein the third face and a lower portion of the second face define a protrusion projecting outwardly from the plane defined by the first major surface.

18 Claims, 8 Drawing Sheets

(56) References Cited

U.S. PATENT DOCUMENTS

| | | |
|---|---|---|
| 5,613,751 A | 3/1997 | Parker |
| 5,618,096 A | 4/1997 | Parker |
| 5,876,107 A | 3/1999 | Parker |
| 5,921,652 A | 7/1999 | Parker |
| 6,002,829 A | 12/1999 | Winston et al. |
| 6,030,089 A | 2/2000 | Parker |
| 6,044,196 A * | 3/2000 | Winston .................... F21V 5/02 349/159 |
| 6,048,081 A | 4/2000 | Richardson |
| 6,079,838 A | 6/2000 | Parker |
| 6,142,652 A | 11/2000 | Richardson |
| 6,347,874 B1 | 2/2002 | Boyd et al. |
| 6,379,016 B1 | 4/2002 | Boyd |
| 6,502,961 B1 | 1/2003 | Richardson |
| 6,565,233 B1 | 5/2003 | Richardson |
| 6,644,823 B2 | 11/2003 | Egawa et al. |
| 6,663,254 B2 | 12/2003 | Ohsumi |
| 6,712,481 B2 | 3/2004 | Parker |
| 6,749,312 B2 | 6/2004 | Parker |
| 6,752,505 B2 | 6/2004 | Parker |
| 6,827,456 B2 | 12/2004 | Parker |
| 6,874,913 B2 | 4/2005 | Munro |
| 6,924,945 B1 | 8/2005 | Richardson |
| 6,974,232 B1 | 12/2005 | Richardson |
| 7,004,611 B2 | 2/2006 | Parker |
| 7,090,389 B2 | 8/2006 | Parker |
| 7,160,015 B2 | 1/2007 | Parker |
| 7,163,332 B2 | 1/2007 | Shimizu |
| 7,165,873 B2 | 1/2007 | Parker |
| 7,195,389 B2 | 3/2007 | Parker |
| 7,226,196 B2 | 6/2007 | Parker |
| 7,322,730 B2 | 1/2008 | Parker |
| 7,354,184 B2 | 4/2008 | Parker |
| 7,356,211 B2 | 4/2008 | Sugiura |
| 7,357,553 B2 | 4/2008 | Parker |
| 7,364,341 B2 | 4/2008 | Parker |
| 7,364,342 B2 | 4/2008 | Parker |
| 7,367,705 B2 | 5/2008 | McCollum |
| 7,374,305 B2 | 5/2008 | Parker |
| 7,384,177 B2 | 6/2008 | Parker |
| 7,404,660 B2 | 7/2008 | Parker |
| 7,404,661 B2 | 7/2008 | Parker |
| 7,434,973 B2 | 10/2008 | Parker |
| 7,434,974 B2 | 10/2008 | Parker |
| 7,467,887 B2 | 12/2008 | Parker |
| 7,497,599 B2 | 3/2009 | Parker |
| 7,513,672 B2 | 4/2009 | Parker |
| 7,524,101 B2 | 4/2009 | Parker |
| 7,537,370 B2 | 5/2009 | Parker |
| 7,563,012 B2 | 7/2009 | Parker |
| 7,667,238 B2 | 2/2010 | Erchak |
| 7,712,932 B2 | 5/2010 | Parker |
| 7,736,043 B2 | 6/2010 | Parker |
| 7,780,329 B2 | 8/2010 | McCollum |
| 7,798,695 B2 | 9/2010 | Parker |
| 7,810,982 B2 | 10/2010 | Parker |
| 7,875,218 B2 | 1/2011 | Parker |
| 7,876,489 B2 | 1/2011 | Gandhi |
| 7,959,341 B2 | 6/2011 | Erchak |
| 7,963,687 B2 | 6/2011 | Parker |
| 8,111,968 B2 | 2/2012 | Chakmakjian |
| 2001/0030857 A1* | 10/2001 | Futhey ...................... F21V 5/02 362/620 |
| 2003/0034445 A1 | 2/2003 | Boyd et al. |
| 2004/0246698 A1* | 12/2004 | Shimizu ............... G02B 6/0036 362/603 |
| 2007/0189701 A1* | 8/2007 | Chakmakjian ....... G02B 6/0028 385/146 |
| 2011/0063855 A1* | 3/2011 | Vissenberg .......... G02B 6/0021 362/311.12 |
| 2011/0194034 A1 | 8/2011 | Shimizu |
| 2012/0275190 A1* | 11/2012 | Matsumoto .......... G02B 6/0036 362/609 |
| 2015/0285983 A1 | 10/2015 | Santoro |
| 2016/0299281 A1 | 10/2016 | Robinson et al. |

FOREIGN PATENT DOCUMENTS

| | | |
|---|---|---|
| CN | 101164006 A | 4/2008 |
| CN | 100432717 C | 11/2008 |
| CN | 101490604 A | 7/2009 |
| EP | 0751340 A2 | 1/1997 |
| EP | 0965789 A2 | 12/1999 |
| EP | 0965788 B1 | 2/2004 |
| EP | 1794639 A2 | 6/2007 |
| EP | 1451502 B1 | 5/2010 |
| EP | 1163473 B1 | 9/2010 |
| EP | 2244005 A1 | 10/2010 |
| EP | 2518544 A1 | 10/2012 |
| EP | 1415110 B1 | 10/2014 |
| JP | 4272751 A | 1/2000 |
| JP | 4448252 B2 | 11/2002 |
| JP | 2003-114337 A | 4/2003 |
| JP | 4349902 B2 | 3/2005 |
| JP | 2008515026 A | 5/2008 |
| JP | 2008519311 A | 6/2008 |
| JP | 4272752 B2 | 6/2009 |
| JP | 2009152207 A | 7/2009 |
| JP | 4378172 B2 | 12/2009 |
| JP | 2010056094 A | 3/2010 |
| JP | 2010056095 A | 3/2010 |
| KR | 1020040017341 A | 2/2004 |
| KR | 20050044695 A | 5/2005 |
| KR | 100729886 B1 | 6/2007 |
| KR | 1020070085643 A | 8/2007 |
| KR | 100961043 B1 | 6/2010 |
| KR | 1020100084704 A | 7/2010 |
| KR | 100979826 B1 | 9/2010 |
| KR | 100989695 B1 | 10/2010 |
| KR | 1020070061901 A | 12/2011 |
| TW | I225543 B | 12/2004 |
| TW | I243920 B | 11/2005 |
| TW | I246576 B | 1/2006 |
| TW | I266845 B | 11/2006 |
| TW | 200846731 A | 12/2008 |
| TW | I333535 B | 11/2010 |
| TW | I362467 B | 4/2012 |
| WO | 2014067009 A2 | 5/2014 |

\* cited by examiner

LIGHT EXTRACTION ELEMENTS

RELATED APPLICATION

This application claims priority to, and incorporates by reference in its entirety, U.S. provisional application No. 61/720,961 filed 31 Oct. 2012.

TECHNICAL FIELD

This invention relates to light extraction elements, and in particular light extraction elements of light guides for light emitting panel assemblies such as luminaires.

BACKGROUND

Light emitting panel assemblies use light guides to transmit light from point light sources such as light emitting diodes (LEDs) to extraction elements where the light is extracted. Luminaires are an example of light emitting panel assemblies.

One objective in lighting is to provide even illuminance on a work plane, which can be achieved by providing a lighting distribution known in the art as a "batwing" distribution. Another objective in lighting is to eliminate or reduce glare. Glare is an effect of luminance at high vertical angles that can cause visual discomfort to users.

Luminance of a luminaire is determined by dividing luminous intensity by projected area at a particular angle.

Conventional luminaires are horizontally oriented, i.e., the luminaire is wider than it is tall. This configuration allows light to leave towards the work plane from traditional sources such as fluorescent and incandescent light sources. A challenge with this configuration is that projected area shrinks as the angle increases so increasing luminous intensity in order to provide even illuminance would create unacceptable levels of high vertical angle luminance, i.e., glare. Baffling is one measure that may be used to mitigate glare in horizontally-oriented luminaires.

Vertically oriented luminaires are advantageous because projected area is smaller at low vertical angles where less luminous intensity is required and projected area increases as the vertical angle increases, as illustrated for example in FIGS. 1 and 2A to 2D. This configuration allows luminous intensity to be higher at higher vertical angles compared to that of a horizontally oriented luminaire, avoiding the problem of glare which would otherwise require resorting to additional measures such as baffling. A challenge with this configuration is that the small projected area at low vertical angles results in high luminance at these angles, as illustrated for example in FIG. 2A. While luminaires are typically installed above users and not in their direct field of view, too much luminance at low vertical angles can still cause visual discomfort in their peripheral field of view. Minimizing luminous intensity at lower vertical angles is thus desirable for vertically oriented luminaires. Conventional light extraction elements, however, typically allow too much light to be emitted at these lower vertical angles.

Light extraction elements that optimize light distribution for vertically oriented luminaires are desirable.

SUMMARY

According to one aspect of the invention, a light guide is provided. The light guide comprises a first major surface comprising an array of Z-shaped extraction elements, each Z-shaped extraction element comprising: a first face; a second face adjoining the first face, wherein the first face and an upper portion of the second face define an indentation projecting inwardly from a plane defined by the first major surface; and a third face adjoining the second face, wherein the third face and a lower portion of the second face define a protrusion projecting outwardly from the plane defined by the first major surface.

The first face and second face may be integrally configured to direct light travelling from an upstream to downstream direction within the light guide incident upon the first face such that (i) at least 75% of light refracted out of the first face at a 20 to 60 degree angle from the vertical will not be incident upon the second face and (ii) light refracted out of the first face at less than 20 degrees from the vertical will be incident upon the second face and either be reflected off the second face at a 20 to 60 degree angle from the vertical or refracted by the second face into the light guide at an angle greater than the angle at which the light was refracted out of the first face.

The first face, second face, and third face may be integrally configured to direct light travelling from an upstream to downstream direction within the light guide not incident upon the first face but incident upon the third face to refract out of the third face at a 20 to 60 degree angle from the vertical.

The first face may be configured to direct light travelling from an upstream to downstream direction within the light guide, and sequentially internally reflecting off the first major surface upstream adjacent the first face and internally reflecting off the first face, to refract out of a second major surface at a 95 to 140 degree angle from the vertical.

The first angle may be defined between a plane of the first face and a plane transverse to the plane of the first major face and may be less than 45 degrees, or less than 30 degrees. The second angle may be defined between the plane of the second face and the plane of the first major surface and may be 20 to 45 degrees.

The third angle may be defined between the plane of the third face and the plane transverse to the plane of the first major face and may be less than 45 degrees, or less than 30 degrees.

The first face and the third face may be configured to provide diffuse refraction of light. The diffusion at the first face and the third face may be provided in a linear pattern, or a non-linear or random pattern.

The dimensions of the first face and the third face may be substantially identical, the first angle and third angle may be substantially identical, and the planes of the first face and the third face may be substantially parallel.

The light guide includes a second major surface opposing the first major surface, and the second major surface may comprise an array of Z-shaped extraction elements. The Z-shaped extraction elements of the second major surface may be disposed opposite the Z-shaped extraction elements of the first major surface. The Z-shaped extraction elements of the first and second major surface may be configured to emit a batwing distribution of light. Each Z-shaped extraction element may span horizontally across its respective major surface.

The light guide may comprise a substrate and a film, wherein the film comprises the first major surface and is applied on the substrate, or the array of Z-shaped elements may be integral with the light guide.

According to another aspect, a method of making a light guide is provided, the method comprising extruding a thermoplastic polymeric material through a die corresponding to the cross sectional shape of a light guide as described herein.

According to another aspect, a method of making a light guide is provided, the method comprising injecting a polymeric material into a mold of a light guide as described herein.

According to another aspect, a method of making a light guide is provided, the method comprising applying to at least one major surface of a substrate a film comprising an array of Z-shaped extraction elements as described herein.

According to another aspect, a luminaire is provided. The luminaire comprises: a housing; a light source; and a light guide as described herein, wherein the light guide is in optical communication with the light source and vertically oriented in the housing.

Further aspects of the invention are provided as described in the following disclosure and accompanying drawings.

BRIEF DESCRIPTION OF THE DRAWINGS

In drawings which show non-limiting embodiments of the invention.

Figure is 1 is an isometric view of a vertically oriented light guide.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The term "inwardly" as used in this specification refers to a direction toward the cross-sectional center of the light guide. The term "outwardly" as used in this specification refers to a direction away from the cross-sectional center of the light guide. The term "upstream" as used in this specification refers to a direction toward where the light source is located. The term "downstream" as used in this specification refers to a direction away from where the light source is located. The terms "vertical", "from the vertical", and like terms when referenced in association with angles in this specification refers to a downward pointing line, as shown for example in FIG. 6, wherein a 0 degree angle from the vertical is directly downward and a 180 degree angle from the vertical is directly upward.

Figure 1:
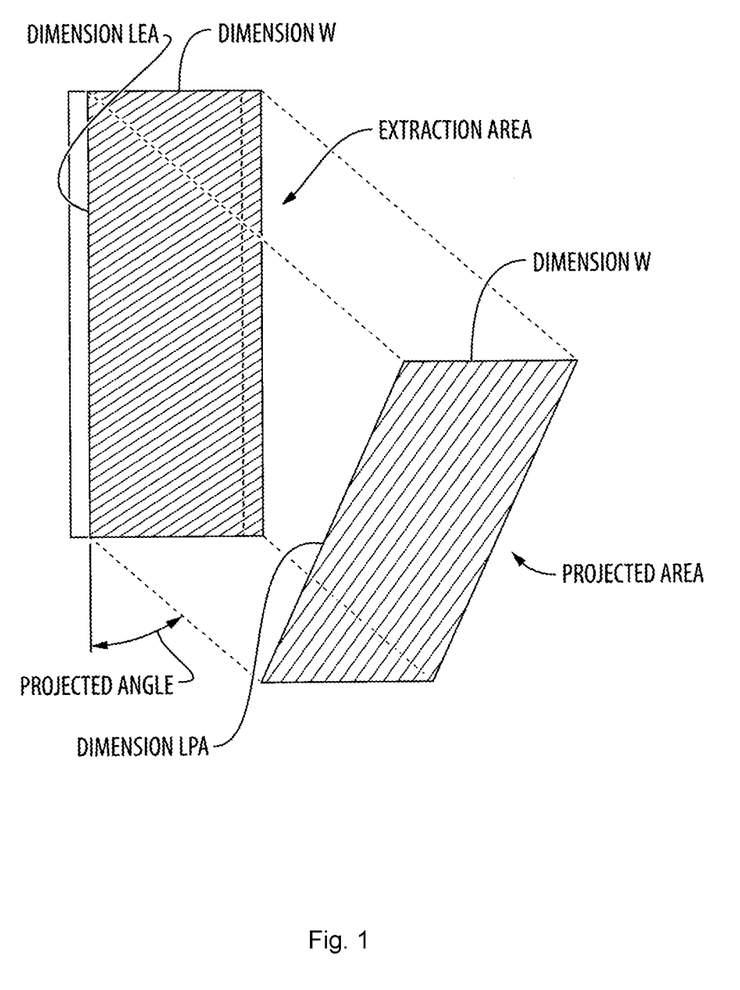
Figure 2A:
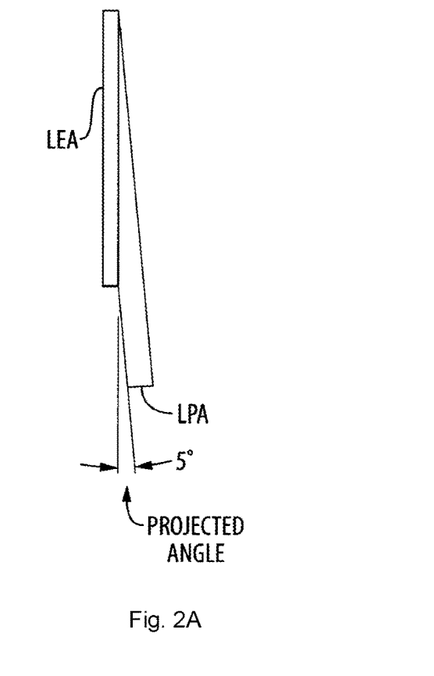
FIGS. 2A to 2D are end views of the light guide of FIG. 1 illustrating projected area at progressively higher angles.
Figure 2B:
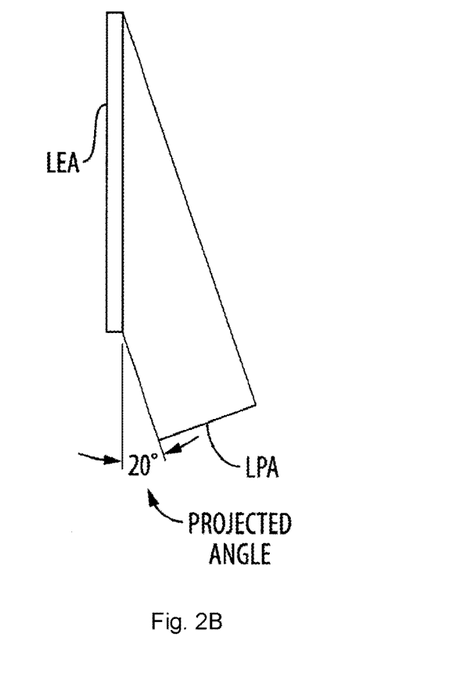
Figure 2C:
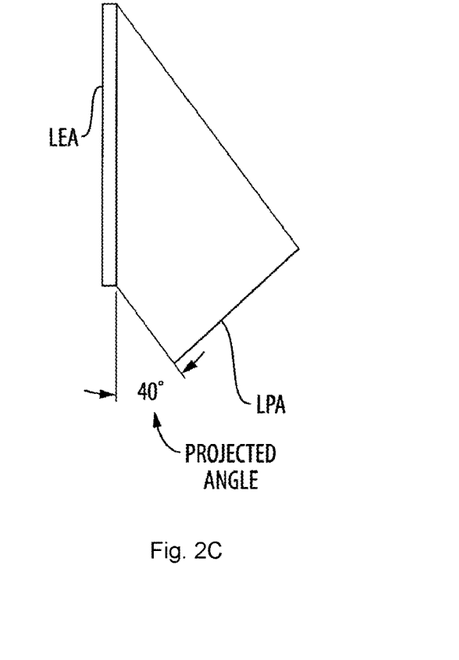
Figure 2D:
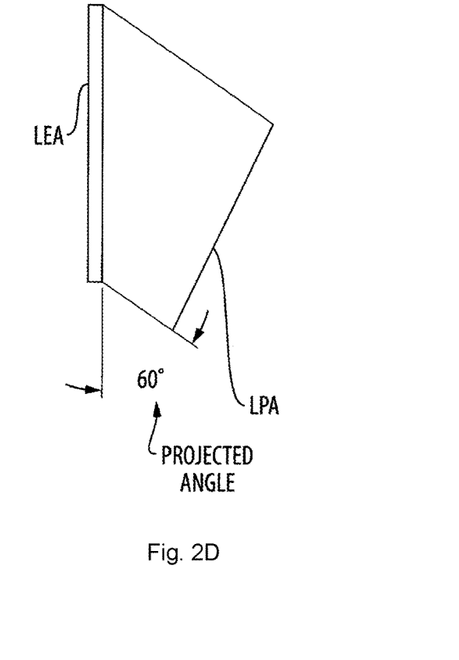
Figure 3:
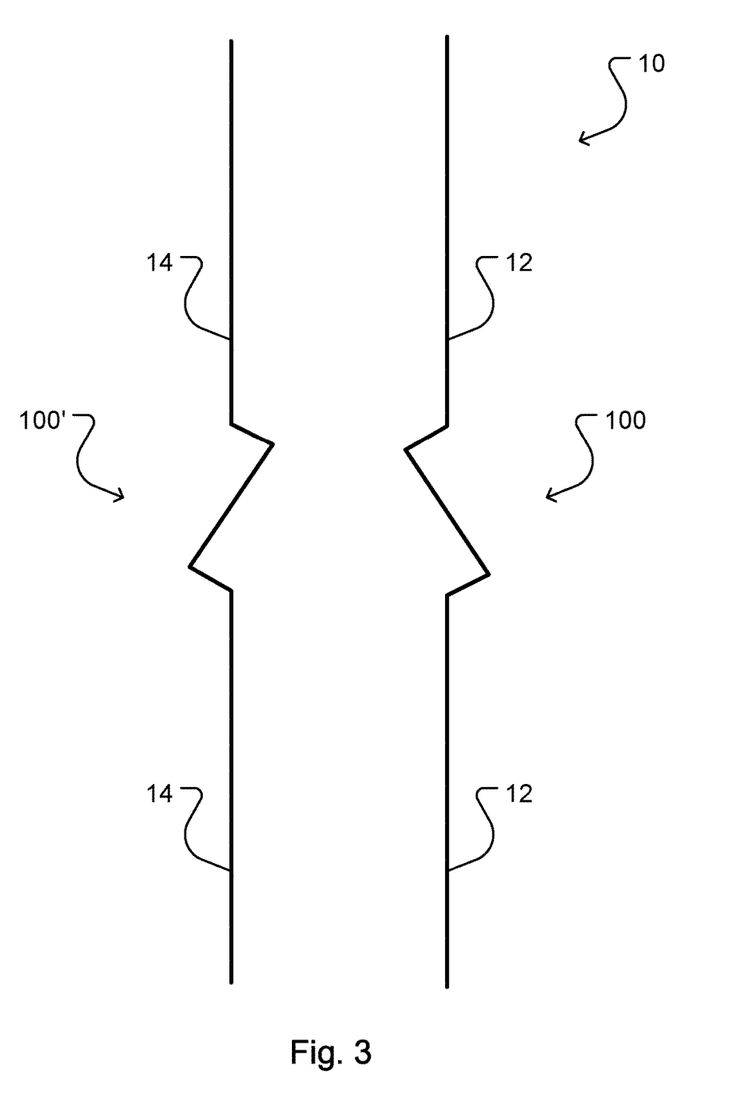
FIG. 3 is a close up partial cross-sectional view of a light guide showing opposing light extraction elements according to an example embodiment.

FIG. 3 shows a cross section view of part of a vertically oriented light guide 10 according to an embodiment of the invention. The illustrated part is from an emission area of light guide 10, that is, where light from a light source (not shown) internally reflecting down light guide 10 is extracted. Light guide 10 includes a first major surface 12 and a second major surface 14. First major surface 12 and a second major surface 14 are generally planar and parallel.

Figure 4:
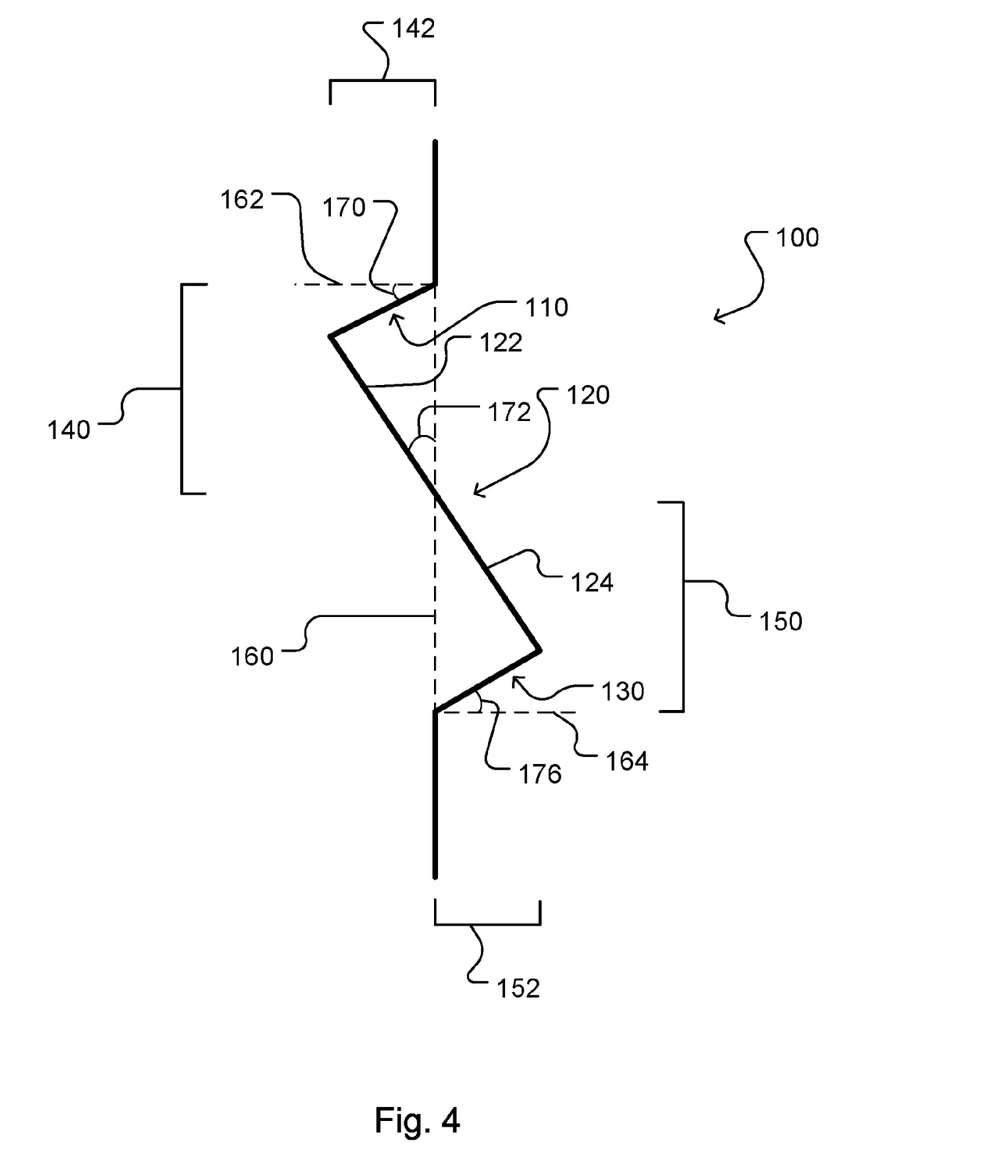
FIG. 4 is a close up partial cross-sectional view of one of the light extraction elements of the light guide of FIG. 3.

First major surface 12 and second major surface 14 each comprise one or more Z-shaped extraction elements 100 and 100' respectively. Extraction elements 100 and 100' are mirror images of, and directly opposite, each other. Extraction elements 100 and 100' span horizontally across first major surface 12 and second major surface 14, respectively, in a continuous manner. First major surface 12 and second major surface 14 may each comprise an array of Z-shaped extraction elements 100 and 100' respectively. In some embodiments, the arrays may comprise extraction elements uniformly distributed across the vertical span of the emission area of the light guide. In other embodiments, the arrays may comprise extraction elements progressively closer together down the vertical span of the emission area of the light guide FIG. 4 shows a close up cross section view of extraction element 100. Extraction element 100 includes a first face 110, second face 120 and a third face 130, together forming a Z-shape or backward Z-shape depending on the end from which the extraction element is viewed. First face 110 and an upper portion 122 of second face 120 define an indentation 140 projecting inwardly from a plane 160 defined by first major surface 12. In some embodiments the depth 142 of indentation 140 relative to plane 160 may range for example from 0.01 mm to 0.5 mm. Third face 130 and a lower portion 124 of second face 120 define a protrusion 150 projecting outwardly from plane 160. In some embodiments the height 152 of protrusion 150 relative to plane 160 may range for example from 0.01 mm to 0.5 mm.

A first angle 170 defined between a plane of first face 110 and a plane 162 normal to plane 160 of first major face 12 may be less than 45 degrees, or less than 30 degrees. A second angle 172 defined between the plane of second face 120 and plane 160 may be 15 to 45 degrees. A third angle 176 defined between the plane of the third face 120 and a plane 164 normal to plane 162 of first major face 12 may be less than 45 degrees or less than 30 degrees. In the illustrated embodiment, first angle 170 and third angle 176 are substantially identical.

In some embodiments, one or more of first face 110, second face 120 and third face 130 are configured to provide diffuse refraction of light. In some embodiments, only first face 110 and third face 130 are configured to provide diffuse refraction of light. In some embodiments, first face 110 and third face 130 are configured to provide diffuse refraction of light embodiments while the second face may, for example, be configured to provide specular refraction of light. Diffuse refraction reduces or eliminates light and dark bands of light caused by the constructive and destructive interference of light as it travels through the light guide. Diffuse refraction may be provided at or adjacent the surface of the face. For example, diffuse refraction may be achieved by providing a diffuse surface on the face, overlaying a diffuse film on the face, providing a diffuse material within the light guide immediately underneath the face, and the like. In some embodiments, the diffusion may be in a linear pattern (e.g. ridges or grooves parallel to plane 160), while in other embodiments the diffusion may be non-linear or random (e.g. randomly arranged bumps or dimples).

Figure 5A:
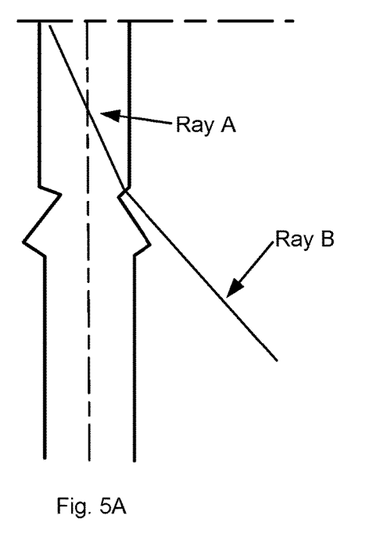
FIGS. 5A to 5D are close up partial cross-sectional views of the light guide of FIG. 3 showing paths of exemplary single light rays from a single light source.

FIGS. 5A to 5D show the paths of representative rays of light internally reflecting down light guide 10, hitting extraction element 100, and exiting light guide 10 in a desirable "batwing" distribution that limits luminous intensity at lower vertical angles. In FIG. 5A, Ray A hits first face 110 and is refracted out of light guide 10. First face 110 and second face 120 are integrally configured such that substantially all light refracting out of first face 110 at vertical angles in the range of 20 to 60 degrees as determined by the Fresnel equations, do not hit second face 120.

Figure 5B:
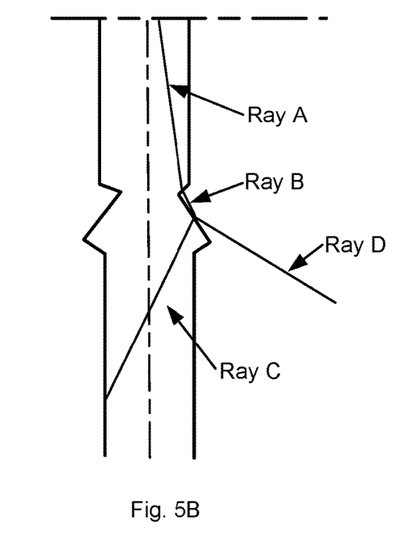

In FIG. 5B, Ray A intersects first face 110, refracts out of light guide 10 as Ray B, which hits second face 120 to split into Ray C refracting into light guide 10 through second face 120 and Ray D reflecting off second face 120. First face 110 and second face 120 are integrally configured such that (a) substantially all light refracting out of first face 110 at vertical angles below 20 degrees as determined by the Fresnel equations hit second face 120, and (b) substantially all light refracting out of first face 110 and hitting second face 120 either (i) refract into light guide 10 through second face 120 at a vertical angle greater than the vertical angle at which the light ray refracted out of first face 110 as determined by the Fresnel equations or (ii) reflect off second face 120 at vertical angles in the range of 20 to 60 as determined by the Fresnel equations.

Figure 5C:
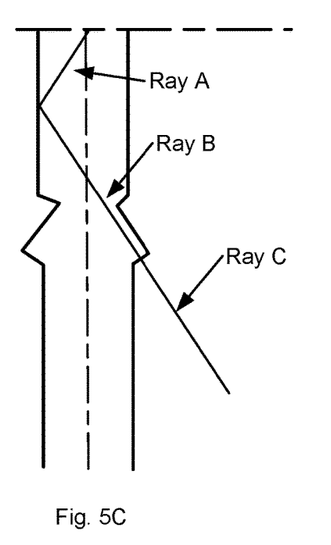

In FIG. 5C, Ray A internally reflects off of major surface 14, and the resulting Ray B hits third face 130 and is refracted out of light guide 10. First face 110, second face 120, and third face 130 are integrally configured such that light internally reflecting down light guide 10 hitting third face 130 but not hitting first face 110 or second face 120 refracts out of third face 130 at vertical angles in the range of 20 to 60 as determined by the Fresnel equations.

Figure 5D:
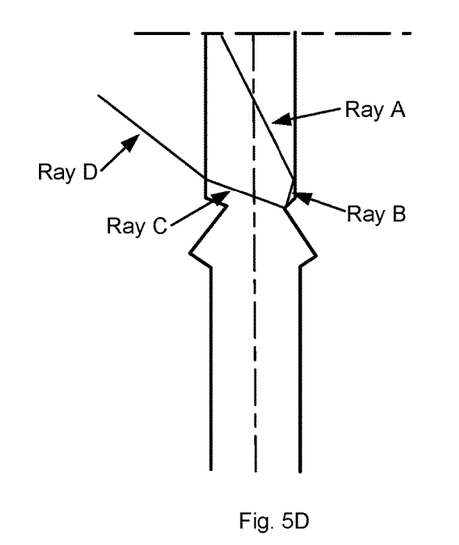

In FIG. 5D, Ray A internally reflects off of major surface 12 as Ray B, which internally reflects off first face 110 as Ray C, which refracts out of second major surface 14. First face 110 is configured such that substantially all light internally reflecting off first major surface 12 subsequently internally reflects off first face 110 and is refracted out of second major surface 14 at a vertical angle in the range of 95 to 140 degrees as determined by the Fresnel equations.

First face 110 and third face 130 are parallel and of substantially identical dimensions. Accordingly, first angle 170 and third angle 176 are substantially identical.

Figure 6:
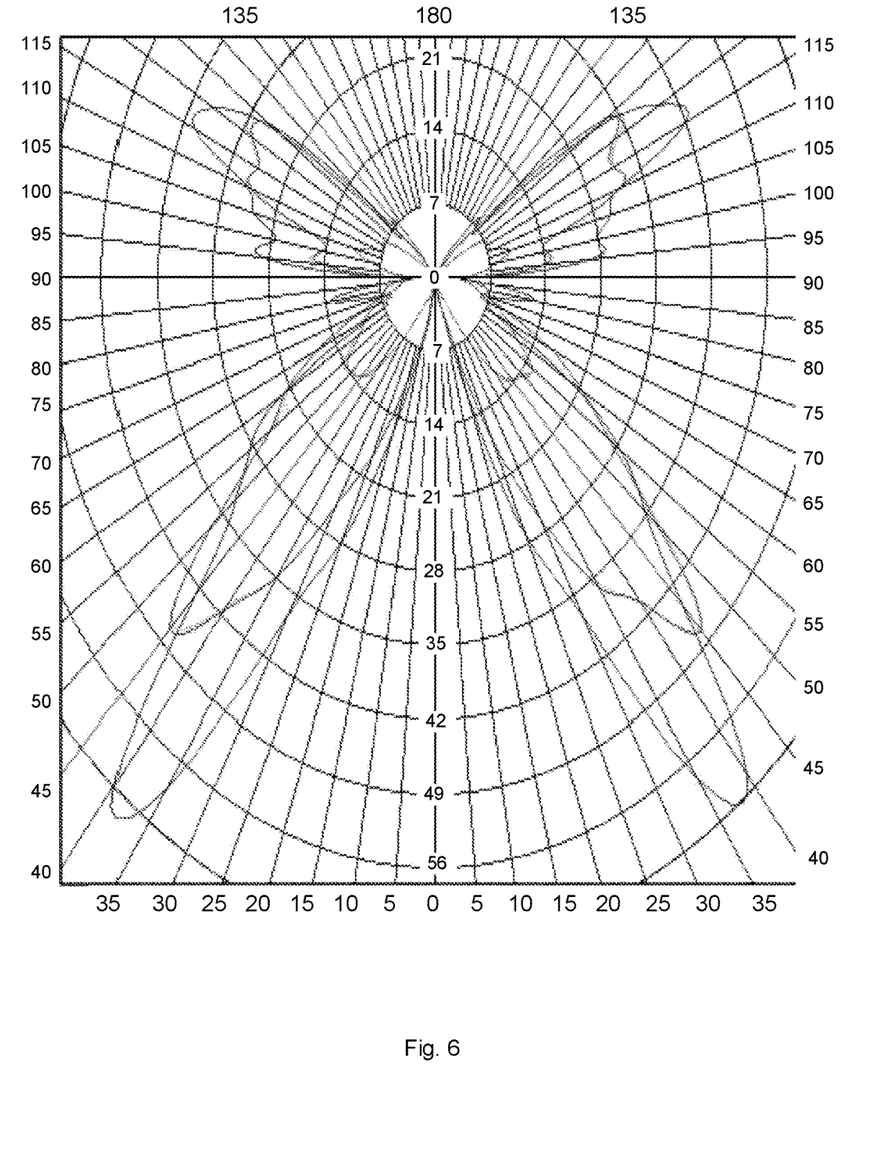
FIG. 6 is an optical distribution plot of light emitted from a light extraction element of a light guide according to an example embodiment.

FIG. 6 is a computer-generated optical distribution plot representative of the optical distribution of a light guide, such as light guide 10, according to an embodiment of the present invention. The batwing distribution shown in FIG. 6 is characterized in the lower half by a strong luminous intensity peak at approximately 40 degrees, and reduced luminous intensities between approximately 0 and 20 degrees and between approximately 60 to 90 degrees. The batwing distribution is further characterized in the upper half by a similar distribution to provide even illumination of surfaces above the light guide.

Figure 7:
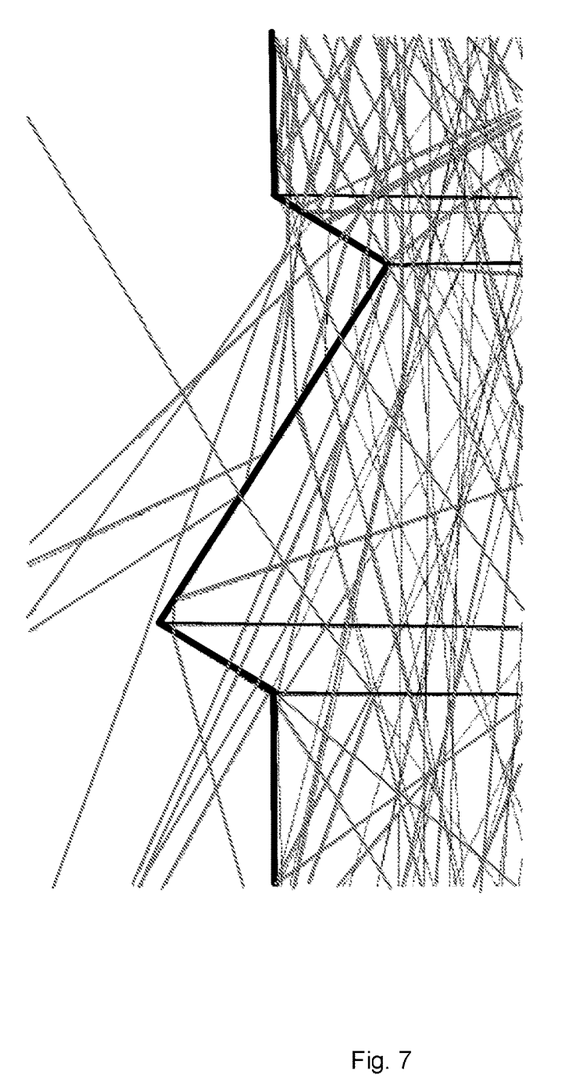
FIG. 7 is a close up partial cross-sectional view of a light extraction element of a light guide according to an example embodiment showing paths of exemplary multiple light rays from a single light source.

FIG. 7 shows a light extraction element of a light guide according to an example embodiment showing the computer-generated paths of exemplary multiple light rays from a single light source. The distribution of light exiting the light guide corresponds to a batwing distribution as shown for example in FIG. 6.

Figure 8:
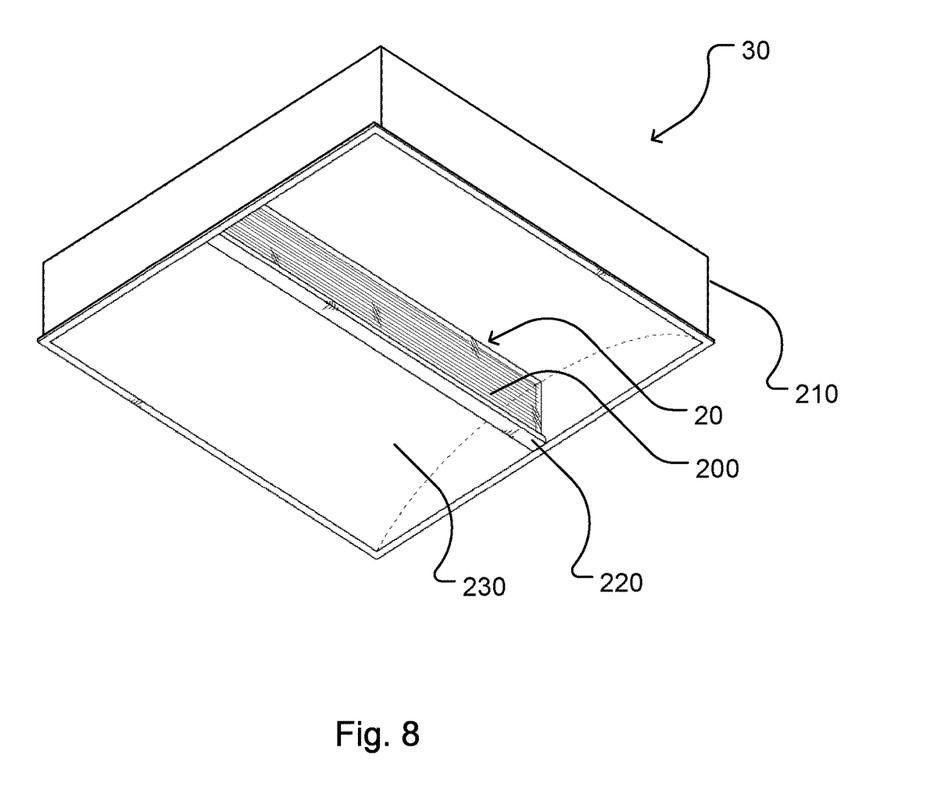
FIG. 8 is an isometric view of a luminaire installed with a light guide comprising light extraction elements according to an example embodiment.

FIG. 8 shows a vertically oriented luminaire 30 installed with a light guide 20 comprising Z-shaped light extraction elements 200 according to an example embodiment. Light guide 20 and light extraction elements may for example be similar or identical to light guide 10 and light extraction elements 100,100' respectively. Light guide 20 is vertically disposed in a housing 210. An opaque horizontal strip 220 is attached to the bottom edge of light guide 20. Strip 220 provides aesthetic appeal and blocks very low vertical angle luminance. Curved interior 230 of housing 210 is made of a reflective material for reflecting upwardly extracted light from light guide 20 down toward the work plane.

In some embodiments, such as those illustrated herein, the extraction elements are integrally formed with the light guide. In such embodiments, the light guide may be formed by extruding a thermoplastic polymeric material through a die corresponding to the desired cross sectional shape of the light guide, or by injecting a polymeric material into a mold in the shape of the light guide. In other embodiments, the light guide may be formed by applying to each side of a planar panel a film comprising one or more extraction elements.

As will be apparent to those skilled in the art in the light of the foregoing disclosure, many alterations and modifications are possible in the practice of this invention. For example, in some embodiments:

Extraction elements 100 and 100' may not be minor images of each other. In some example embodiments, opposing extraction elements may have non-identical profiles.

Extraction elements 100 and 100' may not be disposed in opposing relation to each other. In some example embodiments extraction elements on the first major surface may be offset or staggered with respect to extraction elements of the second major surface.

Extraction elements 100 and 100' may not horizontally span continuously across their respective major surfaces. In some example embodiments the extraction elements may horizontally span across their respective surfaces in a non-continuous manner, for example with one or more breaks (e.g. portions flush with the rest of the major surface) in between extraction element portions.

First face 110 and third face 130 may not be parallel and/or may be of different dimensions.

First major surface 12 and second major surface 14, instead of being parallel, may taper toward each other in the downward direction.

The profile (i.e., cross sectional view) of first major surface 12 and/or second major surface 14 may be straight (as illustrated), curved, stepped, or any other shape.

Light guide 10 may (from a top plan view) be straight, curved, square, rectangular, polygonal, elliptical, circular (i.e., annular), or any other shape.

Light guide 10 may comprise a combination of extraction elements as described herein and one or more other types of extraction elements.

This application is intended to cover any variations, uses, or adaptations of the invention using its general principles. Further, this application is intended to cover such departures from the present disclosure as come within known or customary practice in the art to which this invention pertains and which fall within the limits of the appended claims. Accordingly, the scope of the claims should not be limited by the preferred embodiments set forth in the description, but should be given the broadest interpretation consistent with the description as a whole.

The invention claimed is:

1. A light guide comprising:
a first major surface comprising an array of Z-shaped extraction elements, each Z-shaped extraction element comprising:

a first face;
a second face adjoining the first face, wherein the first face and an upper portion of the second face define an indentation projecting inwardly from a plane defined by the first major surface; and
a third face adjoining the second face, wherein the third face and a lower portion of the second face define a protrusion projecting outwardly from the plane defined by the first major surface; and
a second major surface opposing the first major surface, the second major surface comprising an array of Z-shaped extraction elements
wherein the Z-shaped extraction elements of the first and second major surface both emit a batwing distribution of light.

2. A light guide according to claim 1, wherein the first face and second face are integrally configured to direct light travelling from an upstream to downstream direction within the light guide incident upon the first face such that (i) at least 75% of light refracted out of the first face at a 20 to 60 degree angle from a vertical will not be incident upon the second face and (ii) light refracted out of the first face at less than 20 degrees from the vertical will be incident upon the second face and either be reflected off the second face at a 20 to 60 degree angle from the vertical or refracted by the second face into the light guide at an angle greater than the angle at which the light was refracted out of the first face, wherein the vertical is an imaginary downwardly pointing line extending from the light guide.

3. A light guide according to claim 1 wherein the first face, second face, and third face are integrally configured to direct light travelling from an upstream to downstream direction within the light guide not incident upon the first face but incident upon the third face to refract out of the third face at a 20 to 60 degree angle from a vertical, wherein the vertical is an imaginary downwardly pointing line extending from the light guide.

4. A light guide according to claim 1, wherein the first face is configured to direct light travelling from an upstream to downstream direction within the light guide, and sequentially internally reflecting off the first major surface upstream adjacent the first face and internally reflecting off the first face, refracts out of a second major surface at a 95 to 140 degree angle from a vertical, wherein the vertical is an imaginary downwardly pointing line extending from the light guide.

5. A light guide according to claim 1, wherein a first angle defined between a plane of the first face and a plane transverse to the plane of the first major face is less than 45 degrees, or less than 30 degrees.

6. A light guide according to claim 1, wherein a second angle defined between the plane of the second face and the plane of the first major surface is 15 to 45 degrees.

7. A light guide according to claim 1, wherein a third angle defined between the plane of the third face and the plane transverse to the plane of the first major face is less than 45 degrees, or less than 30 degrees.

8. A light guide according to claim 1 wherein the first face and the third face are configured to provide diffuse refraction of light.

9. A light guide according to claim 8 wherein the diffusion at the first face and the third face are provided in a linear pattern.

10. A light guide according to claim 8 wherein the diffusion at the first face and the third face are provided in a non-linear or random pattern.

11. A light guide according to claim 1, wherein the dimensions of the first face and the third face are substantially identical.

12. A light guide according to claim 1, wherein the first angle and third angle are substantially identical.

13. A light guide according to claim 1, wherein the planes of the first face and the third face are substantially parallel.

14. A light guide according to claim 1, wherein the Z-shaped extraction elements of the second major surface are disposed opposite the Z-shaped extraction elements of the first major surface.

15. A light guide according to claim 1 wherein each Z-shaped extraction element spans horizontally across its respective major surface.

16. A light guide according to claim 1 comprising a substrate and a film, wherein the film comprises the first major surface and is applied on the substrate.

17. A light guide according to claim 1 wherein the array of Z-shaped elements is integral with the light guide.

18. A luminaire comprising:
a housing;
a light source;
a light guide according to claim 1, wherein the light guide is in optical communication with the light source and vertically oriented in the housing.

* * * * *